INVENTORS.
CARLO BARASSI
GIULIO CAPPA

United States Patent Office 3,496,981
Patented Feb. 24, 1970

3,496,981
COUPLING PROFILE IN REMOVABLE TREAD TIRES
Carlo Barassi and Giulio Cappa, Milan, Italy, assignors to Pirelli S.p.A., Milan, Italy
Filed Sept. 25, 1967, Ser. No. 670,217
Claims priority, application Italy, Oct. 31, 1966, 29,450/66
Int. Cl. B60c 11/02
U.S. Cl. 152—187          9 Claims

ABSTRACT OF THE DISCLOSURE

A pneumatic tire having a reinforced tread ring separate from and extending around its carrying casing, with the respective engaging surfaces of the tread ring and the carrying casing being stepped in the transverse direction of the tire.

BACKGROUND OF THE INVENTION

Field of the invention

The present invention relates to removable tread tires of the type in which the tread ring is anchored to the carrying casing by virtue of the inflation pressure of the tire, and, in particular, to such a tire in which the coupling profiles of the tread ring and the carrying casing are stepped.

Prior art

It is generally well known to provide a pneumatic tire in which the tread ring of the tire is anchored to the carrying casing by virtue of the inflation pressure of the tire. In a tire so assembled and inflated, the "coupling profiles" or the respective contact surfaces of the tread ring and the carrying casing extending along their respective widths are complementary, i.e., at least one cavity is formed in one of these surfaces and a corresponding projection on the other, and/or vice versa.

In these types of tires, the tread ring is generally provided with an inner armour, and the casing has such a size that if it were inflated devoid of the tread ring, it would assume an outer diameter greater than the inner diameter of said tread ring. The anchorage of the tread ring on the carrying casing is thus ensured due to the fact that the former, by virtue of the armour, withstands the expansion of the carrying casing and is thus forced thereon.

Applicants' U.S. Patent No. 3,091,273 describes the construction of a pneumatic tire of the above-indicated type in which the armour of the tread ring consists of two or more layers of cord fabric disposed along two directions crossing with each other and inclined at angles ranging between 5° and 20° with respect to the mid-circumferential plane of the tread ring. Also in this arrangement, the tread ring is provided with a coupling profile comprising a central smooth portion and two projections in the lateral portions, while the carrying casing has a complementary coupling profile. The inflation pressure of the tire thus tends to expand the armour of the tread ring and consequently, the inclination of the cords of the armour changes somewhat in a manner so that the cords tend to extend in a substantially longitudinal direction with respect to the tread ring, thus causing a certain reduction in the width of the latter. However, this reduction in width is opposed by the presence of the projections in the lateral portions of the tread ring, so that the final result is a transversal thrust exerted by the tread ring on the carrying casing, which considerably aids the anchorage of the former on the latter.

In the tires of the above-described type, it is, however, impossible to obtain such a transversal thrust of relative high values, especially in the case of large size tires. In fact, the maximum value of this thrust is limited by the greatest force which the projections in the lateral portions of the tread ring are able to transmit to the carrying casing. This latter force is generally low, since the thickness of the projections cannot be too low in order to prevent too high specific pressures and, on the other hand, cannot be too high, since otherwise, they would be excessively flexible.

The above-cited patent attempts to alleviate this by reinforcing the projections with metallic wires, but this solution also does not permit this transversal thrust to be as high as desired.

SUMMARY OF THE INVENTION

It is therefore an object of the present invention to provide a tread tire in which the tread ring exerts on the carrying casing a transversal thrust having a value by far greater than that obtainable in conventional tires.

Briefly summarized, the pneumatic tire of the present invention includes a tread ring anchored to a carrying casing by virtue of the inflation pressure of the tire, the tread ring being provided, in proximity of its inner surface, with a reinforcing armour consisting of two or more layers of cords crossed with respect to each other and inclined with respect to the mid-circumferential plane of the tire, the portion of the outer surface of the carrying casing intended to form the seat for the tread ring having a coupling profile constituted by steps decreasing from the central portion towards the lateral portions, and the inner surface of the tread ring having a complementary coupling profile.

BRIEF DESCRIPTION OF THE DRAWINGS

The invention will not be better described with reference to the attached drawings, given by way of example, in which.

DESCRIPTION OF THE PREFERRED EMBODIMENTS

Figure 1:
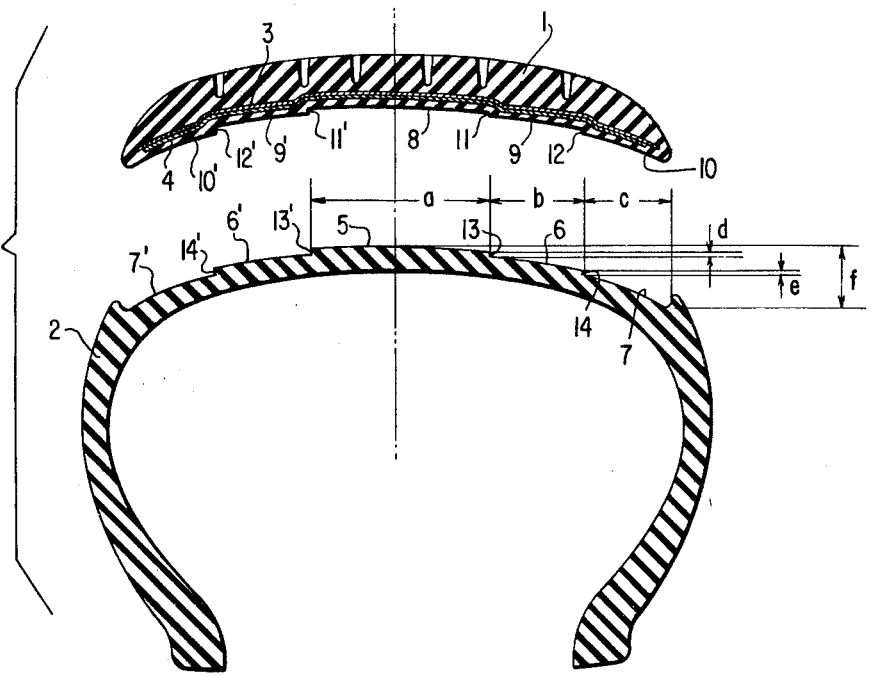
FIG. 1 is a cross section of the tire in accordance with the invention, with the tread ring being moved away from the carcass to aid in illustration.
Figure 2:
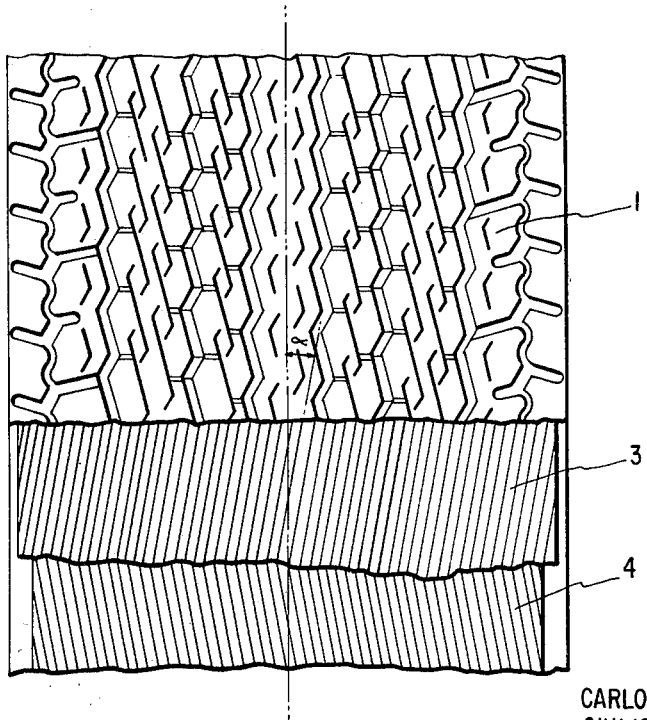
FIG. 2 is a plan view of the tread ring of FIG. 1, in which parts are broken away to show the position of the treads constituting the armour.

Referring specifically to the drawings, the reference numeral 1 refers to a tread ring which is coupled to a carrying casing 2. The tread ring 1, in proximity of its inner surface, is provided with a reinforcing armour constituted by two layers 3 and 4 of cords parallel to one another in each layer. The cords of each layer are inclined at an angle $\alpha$ between 5° and 25° with respect to the mid-circumferential plane of the tread ring, and are crossed with respect to those of the other layer. For the purpose of illustration, angle $\alpha$ is shown as being approximately 10° in FIG. 2.

The coupling profile of the carrying casing 2 consists of a smooth central porjecting portion 5, at the sides of which there are provided steps 6', 6', 7 and 7'. This profile corresponds to the complementary profile of the tread ring, which comprises a central recessed portion 8 adapted to receive the corresponding central portion 5 of the carrying casing, and the steps 9, 9', 10 and 10' corresponding to the steps 6, 6', 7 and 7' of the carrying casing, respectively.

When the tire is inflated, the cords of the layers 3 and 4 tend to vary their angular position and to extend in a longitudinal direction with respect to the tread ring. Consequently, the width of the tread ring 1 tends to reduce, but is prevented from doing so by the presence of the steps of the coupling profile.

In fact, the vertical walls 11, 11', 12 and 12' of the tread ring exert a transversal thrust against the vertical walls 13, 13', 14 and 14', respectively, of the carrying casing. This thrust is relatively high by virtue of the transversal rigidity of the steps made possible by the low ratio between their height and width and due to the fact that the thrust is subdivided between the various steps of the coupling profile. Therefore, the specific pressure corresponding to these steps is comparatively low, and consequently, it is possible to design the steps with a very reduced height with respect to their width, thus obtaining a good transverse rigidity of same.

According to a preferred embodiment of the invention, the ratio between the height and the width of each strip is between 0.05 and 0.20.

Also, the tread ring of the tire of the present invention may have a transversal curvature which has the same amplitude as its longitudinal curvature. This is not feasible in the known arrangements since in the latter, the coupling profile would be practically constituted by a spherical surface, and this would cause the ring to slide from the carrying casing. However, the steps formed on the couping profile in accordance with the present invention present the occurrence of this problem.

According to the present invention, this unique transversal curvature is obtained, in most instances, when the difference between the diameter of the casing measured at the center of the coupling profile, and the diameter of the casing measured at the edge of the coupling profile is between 3% and 12% of said diameter measured at the center.

The coupling profile forming the object of the present invention is generally symmetrical with respect to the midcircumferential plane of the tire. It should be understood, however, that it is possible to build up the tires with an asymmetrical coupling profile when advisable in view of the type of stress to which the tire is to be subjected.

To give an example of the exact dimensions that may be used in the tire of the present invention, the tire illustrated in the drawings is of a size 185-14 and has a central portion 5 of a width $a$ of 52 mm. The steps 6 and 7 each have a width $b$ and $c$ of 26 mm. and a height $d$ and $e$ of 2.5 mm. respectively. The difference 2 $f$ between the diameter at the center and the diameter at the edge of the coupling profile is 18 mm., equal to 6% of the diameter at the center. This transversal curvature can be utilized without any inconvenience, owing to the presence of the steps 6 and 7 which prevent the slipping of the ring with respect to the casing.

Also, the width of central portions 5 and 8 may be equal to approximately 33% of the entire width of their respective coupling profiles.

Although the above-indicated values refer to one side of the coupling profile of the carcass, they are also valid for the other side, and for the coupling profile of the tread ring.

Of course, it is also understood that any size tire other than that described in the preceding example can be made in accordance with the present invention.

Also, the carrying casing 2 can be provided with a carcass (not represented in the figures) which is preferably of the so-called radial type, having cords lying in radial planes or forming small angles with said planes.

It should be further understood that the above example is not of a limiting character, and that the scope of the present invention includes any other embodiment derived from the above-indicated inventive principle. In particular, the width and the height of the various steps can be different. For example, the width can be reduced in geometrical progression from the center to the sides, while at the same time the height can be increased in geometrical progression in the same sense.

Of course, other variations of the specific construction and arrangement of this type device herein disclosed can be made by those skilled in the art without departing from the invention as defined in the appended claims.

What is claimed is:

1. A removable tread tire comprising a carrying casing and a tread ring having a reinforcing armour provided in proximity of its inner surface so that said tread ring may be anchored on said casing by virtue of the inflation pressure of the tire, wherein the improvement comprises a stepped, transversely extending coupling profile provided on the inner surface of the tread ring and the portion of the outer surface of the carrying casing intended to form the seat for the tread ring, said coupling profile comprising a plurality of steps and said profile decreasing in height from the central portions of the casing and tread ring towards the lateral portions thereof, and wherein the height of each step of each of said coupling profiles is smaller than the width.

2. The tire of claim 1, wherein said reinforcing armour comprises at least one layer of cords, the cords of one layer being crossed with respect to the cords of an adjacent layer, said cords being inclined with respect to the mid-circumferential plane of said tire.

3. A tire as in claim 1, wherein each of said coupling profiles is provided with two steps to each side of the mid-circumferential plane of said tire.

4. A tire as in claim 1, wherein said stepped coupling profiles are symmetrical with respect to the mid-circumferential plane of the tire.

5. A tire as in claim 1, wherein the difference between the diameters of said casing measured at the center and at the edge of its coupling profile is between 3% and 12% of said diameter at its center.

6. A tire as in claim 1, wherein said coupling profiles decrease in height from the central portions of the casing and tread ring towards the lateral portions thereof.

7. A pneumatic tire comprising a carrying casing and a tread ring separate from and extending around said casing, the respective engaging surfaces of said carrying casing and said tread ring being stepped in the transverse direction of said tire, wherein the width of the central portion of each of said engaging surfaces comprised between the two steps nearest to the mid-circumferential plane of the tire is equal to approximately 33% of the width of each engaging surface.

8. A removable tread tire comprising a carrying casing and a tread ring having a reinforcing armour provided in proximity of its inner surface so that said tread ring may be anchored on said casing by virtue of the inflation pressure of the tire, wherein the improvement comprises a stepped, transversely extending coupling profile provided on the inner surface of the tread ring and the portion of the outer surface of the carrying casing intended to form the seat for the tread ring, said coupling profile comprising a plurality of steps decreasing in height from the central portions of the casing and tread ring towards the lateral portions thereof, and wherein the ratio between the height and the width of each of said steps is between 0.05 and 0.20.

9. A removable tread tire comprising a carrying casing and a tread ring having a reinforcing armour provided in proximity of its inner surface so that said tread ring may be anchored on said casing by virtue of the inflation pressure of the tire, wherein the improvement comprises a stepped, transversely extending coupling profile provided on the inner surface of the tread ring and the portion of the outer surface of the carrying casing intended to form the seat for the tread ring, said coupling profile comprising a plurality of steps decreasing in height from the central portions of the casing and tread ring towards the lateral portion thereof, and wherein the width of the central portion of each of said coupling profiles comprised between the two steps nearest to the mid-circumferential plane of the tire is equal to approximately 33% of the width of the whole coupling profile.

References Cited

UNITED STATES PATENTS

| 2,609,026 | 9/1952 | Luchsinger-Caballero | 152—176 |
| 3,087,526 | 4/1963 | Barassi et al. | 152—176 |

FOREIGN PATENTS

| 897,442 | 5/1962 | Great Britain. |

DRAYTONE HOFFMAN, Primary Examiner

CHARLES B. LYON, Assistant Examiner